United States Patent [19]

Beardmore et al.

[11] Patent Number: 4,597,300
[45] Date of Patent: Jul. 1, 1986

[54] ARRANGEMENTS AND METHODS OF MOUNTING A UNIT IN A CASING

[75] Inventors: Geoffrey Beardmore; Antony P. Neville, both of Cheltenham, England

[73] Assignee: Smiths Industries Public Limited Company, London, England

[21] Appl. No.: 591,655

[22] Filed: Mar. 20, 1984

[30] Foreign Application Priority Data

Mar. 31, 1983 [GB] United Kingdom ............... 8308963

[51] Int. Cl.$^4$ ............................................. G01C 19/02
[52] U.S. Cl. .................................. 74/5 R; 74/5.7; 310/51
[58] Field of Search .................. 74/5 R, 5.7; 310/51

[56] References Cited

U.S. PATENT DOCUMENTS

| | | | |
|---|---|---|---|
| 2,620,151 | 12/1952 | Peters | 310/51 |
| 2,805,577 | 9/1957 | Shomphe | 74/5 R |
| 3,191,897 | 6/1965 | Comerer | 310/51 X |
| 3,256,828 | 6/1966 | Rule | 310/51 |
| 3,430,276 | 3/1969 | Ashley et al. | 74/5 R |
| 3,446,081 | 5/1969 | Oger | 74/5.7 |
| 3,677,097 | 7/1972 | Quermann | 74/5 R |
| 3,843,108 | 10/1974 | Krupick et al. | 74/5 R X |
| 4,283,959 | 8/1981 | Strittmatter et al. | 74/5 R X |
| 4,413,199 | 11/1983 | Fischer | 310/51 X |
| 4,454,777 | 6/1984 | Krupick et al. | 74/5.46 |

FOREIGN PATENT DOCUMENTS

| | | | |
|---|---|---|---|
| 243916 | 11/1960 | Australia | 310/51 |
| 450294 | 8/1948 | Canada | 310/51 |
| 952197 | 10/1956 | Fed. Rep. of Germany | 310/51 |
| 810279 | 3/1959 | United Kingdom | 74/5 R |
| 1179217 | 1/1970 | United Kingdom . | |
| 1421032 | 1/1976 | United Kingdom . | |
| 2063471 | 6/1981 | United Kingdom | 74/5 R |

*Primary Examiner*—Rodney H. Bonck
*Assistant Examiner*—Dwight G. Diehl
*Attorney, Agent, or Firm*—Pollock, Vande Sande & Priddy

[57] ABSTRACT

The inner unit of a gyroscope is of circular shape and is formed with an inclined outer edge at one end. The inner unit slides within an outer casing having a transverse end face at one end. An annular recess of triangular section is thereby defined between the inner unit and casing which receives a ring of resilient material. During assembly the inner unit is urged against the end of the casing, to compress the ring within the recess, by reducing pressure within the casing. The inner unit is held in position, with the ring compressed, by soldering an end plate to the casing. The pressure within the casing can then be returned to normal.

8 Claims, 2 Drawing Figures

ARRANGEMENTS AND METHODS OF MOUNTING A UNIT IN A CASING

BACKGROUND OF THE INVENTION

This invention relates to arrangements and methods of mounting a unit in a casing.

The invention is more particularly, but not exclusively, concerned with arrangements and methods of mounting gyroscope equipment in a casing.

Because of the high rotational speeds of gyroscopes, they can be prone to vibration. Although attempts are usually made to ensure that mechanical components of the gyroscope are a close fit within the casing so as to reduce any vibration within the casing, there has to be sufficient clearance between the casing to allow for easy insertion and removal. There is also the problem that the heat produced by the gyroscope can cause differential thermal expansion with respect to the casing. If no room is left within the casing to accommodate such expansion it can result in stress on the gyroscope components.

BRIEF SUMMARY OF THE INVENTION

It is an object of the present invention to provide apparatus that can be used to alleviate these problems.

According to one aspect of the present invention there is provided apparatus including an inner unit contained within an outer casing, the casing being provided with a transverse face towards one end, and the inner unit being provided at one end with an inclined edge surface that defines, with the transverse face, an annular recess of substantially triangular section, the apparatus including a ring of resilient material that extends within the recess, and the inner unit being secured in the casing such that the ring is held in compression between the inner unit and the outer casing.

The resilient ring exerts a restraining force on the inner unit that helps reduce vibration of the inner unit relative to the casing.

The edge surface may be inclined to the transverse face at an angle of about 60°. The recess and the ring may be of circular shape. The ring may have a substantially circular cross-section in its natural state. The inner unit may be spaced from the casing at the one end. The transverse face may be provided by the inside face of one end of the casing. The inclined edge surface may be the outer edge surface of the inner unit. The outer casing may be sealed at its other end. The inner unit may include gyroscope apparatus.

According to another aspect of the present invention there is provided a method of mounting an inner unit within an outer casing, the outer casing having a transverse face therein towards one end, and the inner unit having an inclined edge surface at one end, a ring of resilient material being positioned in said casing against the transverse face, said inner unit being inserted within the outer casing so that said edge surface contacts said ring, pressure within said casing being reduced relative to pressure outside the casing so as thereby to force the inner unit further into the casing, and the inner unit being then secured in position relative to the casing with the ring in compression.

The pressure within the casing may be made equal to pressure outside the casing after the inner unit is secured in position.

Gyroscope apparatus and a method of assembly of gyroscope apparatus, in accordance with the present invention, will now be described, by way of example, with reference to the accompanying drawings.

DETAILED DESCRIPTION

Figure 1:
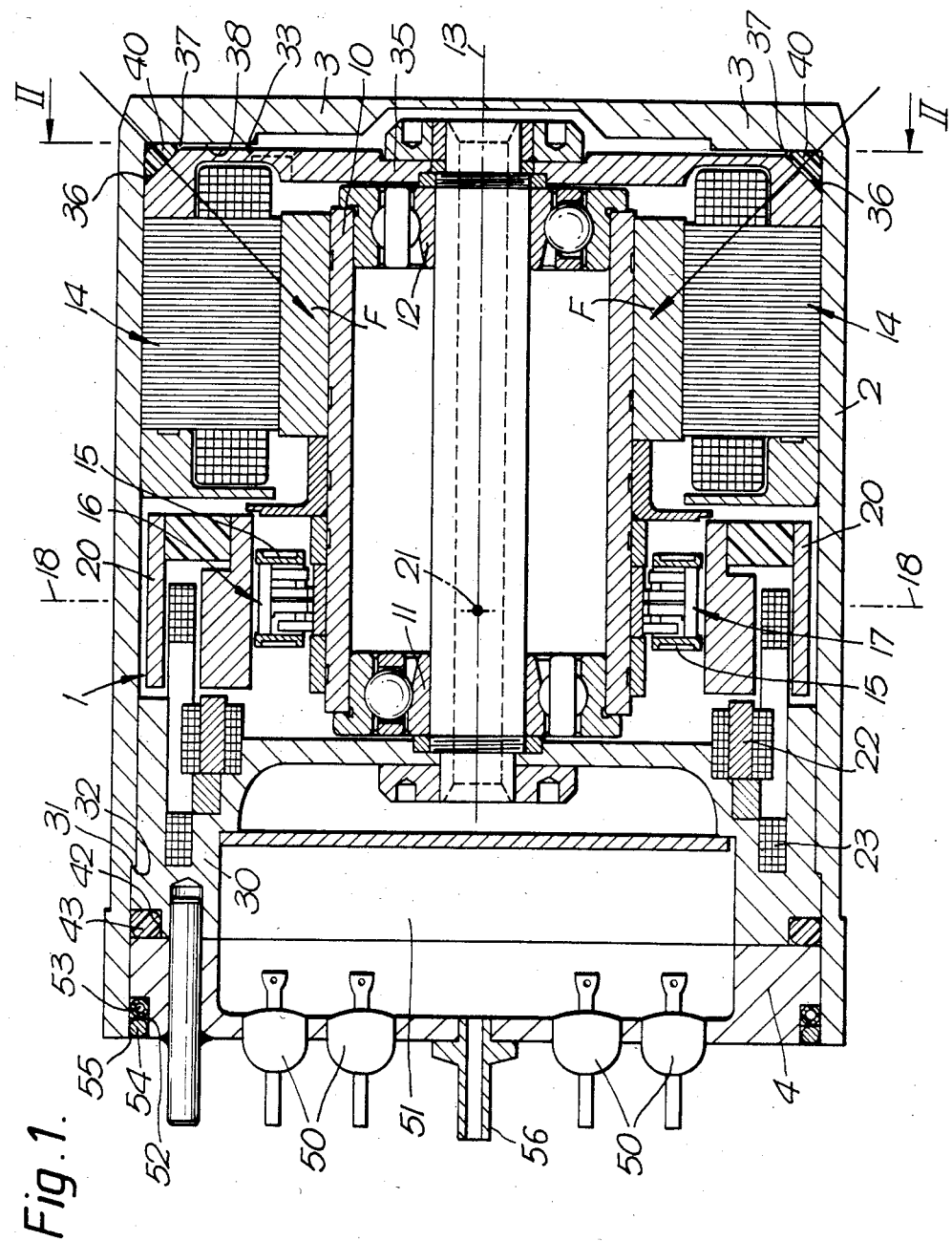
FIG. 1 is a sectional side elevation of the apparatus.
Figure 2:
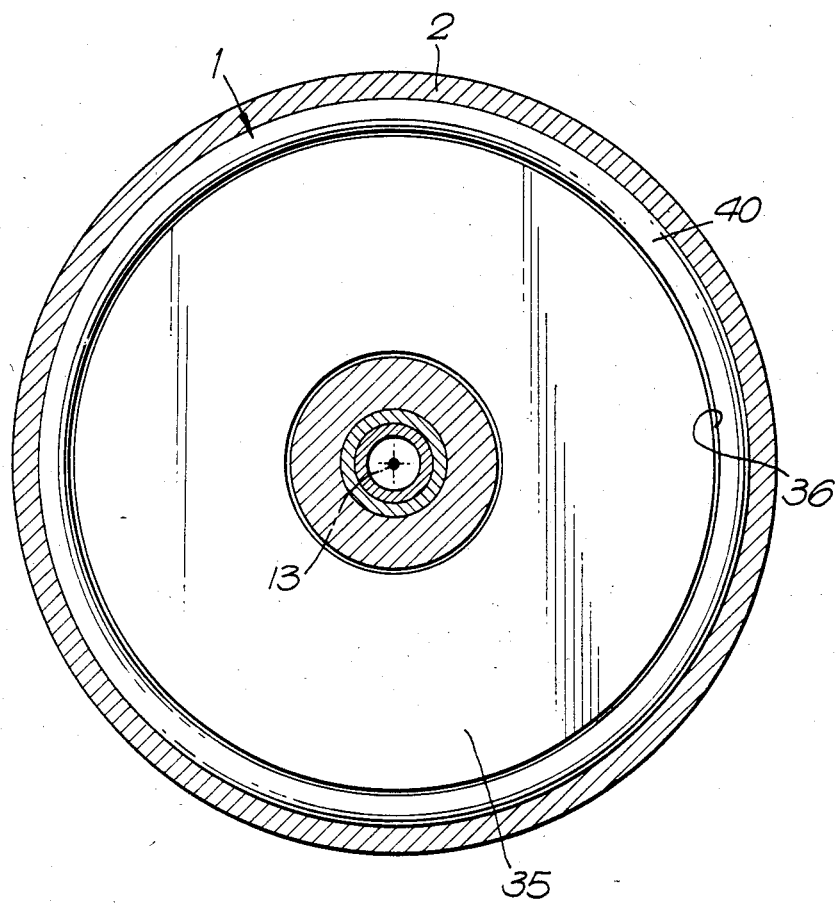
FIG. 2 is a cross-section of the apparatus along the line II—II of FIG. 1.

The apparatus comprises an inner unit 1, including the gyroscope mechanics, that extends within an outer casing 2 that is closed at one end 3. The other end of the apparatus is sealed by an end plate 4 that abuts the inner unit 1.

The construction and operation of the gyroscope mechanism is substantially the same as that described in the specification of UK Patent Application No. GB 2 063 471A so it will only be described briefly here. The inner unit 1 is of generally cylindrical configuration having a tubular rotor 10 that is supported at opposite ends by bearings 11 and 12. The rotor 10 is rotated about the longitudinal axis 13 of the apparatus by a motor 14 located towards the right hand end of the unit 1. A gimbal ring 15 is supported by two flexure pivots 16 and 17 on the left hand end of the rotor 10 so that the gimbal ring is free for limited angular displacement about an axis 18 at right angles to the longitudinal axis 13. An inertia ring 20 encircles the gimbal ring 15 and is supported on it by two further flexure pivots (not shown), located intermediate the pivots 16 and 17. In this way, the inertia ring is free for displacement about an axis 21, at right angles to the other axes 13 and 18 and hence is supported about the two perpendicular axes 18 and 21.

Displacement of the gyroscope apparatus having a component about either axis 18 or 21 causes displacement of the inertia ring 20 relative to the remainder of the apparatus, since the inertia ring tends to retain its original attitude. This relative displacement is sensed by a pick-off 22, the output of which is used to control the supply of current to torquer coils 23. The torquer coils 23 exert a restoring force on the inertia ring to keep it in a datum position relative to the gyroscope structure, the current supplied to the coils being used to provide an indication of the displacement rate of the gyroscope.

At the rear end of the inner unit 1 there is a dish-shape base member 30 that is formed around its outer edge with a circumferential lip 31. The lip 31 engages a cooperating shoulder 32, formed around the inside of the outer casing 2, close to its rear end. The shoulder 32 forms a shallow step between the forward end of the casing 2 and the rear end which is of slightly greater internal diameter. Engagement of the lip 31 with the shoulder 32 locates the inner unit 1 against forward axial movement.

The forward end of the inner unit 1 carries a radially-extending plate member 35 that is a close fit around its edge within the forward end of the casing 2. The forward face of the plate member 35 is parallel with the closed end of the casing 2 and is separated from it by a small clearance 33. The edge of the plate member 35 is bevelled at its forward end to form an annular surface 36 that is inclined at about 30° to the curved wall of the casing 2 and at about 60° to its closed end. This inclined edge 36 defines an annular cavity 37 of triangular section with the inner face 38 of the closed end 3 of the casing 2. Within the cavity 37 there is located a resilient support ring 40, such as of rubber or plastics material. The ring 40 has, in its natural state, a circular cross-section. The thickness of the ring 40 is such that, when the inner unit 1 is pushed forwardly to its full extent, the ring is compressed between the forward end of the inner unit and the casing 2. The compressive forces exerted against the inner unit 1 are directed perpendicular to the inclined edge 36, along the arrow F in FIG. 1. This force therefore has a component parallel to the axis of the gyroscope and a component transverse of the gyroscope. These components thereby act on the inner unit 1 to resist and damp any transvere or axial displacement, such as may be caused by vibration. The small clearance 33 between the forward end of the inner unit 1 and the casing allows for some limited relative axial displacement and, in this respect accommodates differential thermal expansion of the central unit.

At its rear end, the base member 30 has an annular step 42 of square section that receives a sealing ring 43. The ring 43 engages the inner surface of the casing 2 and the forward surface of the end plate 4. The end plate 4 carries various terminals 50 that serve to make electrical connection with an electronic unit 51 located between the base member 30 and the end plate 4. Around its rear end, the end plate 4 also has an annular step 52 of rectangular section that receives two sealing rings 53 and 54. The inner sealing ring 53 is of a resilient material and of a thickness that ensures that it is compressed within the step 52 in close contact with the end plate 4 and the casing 2. The outer ring 54 is of metal and serves primarily as a filler, the ring being secured in the step 52 by means of solder 55 which provides an effective seal with the casing 2. A sealable spigot 56 is located centrally of the plate 4. The spigot 56 provides a passageway to the interior of the gyroscope apparatus which can be used to remove air from, or introduce gas to, the apparatus, and is subsequently sealed.

The gyroscope is readily assembled by first placing the support ring 40 in the forward end of the casing 2. The inner unit 1 is then slid into the casing 2 so that the inclined edge 36 engages the support ring 40. The sealing ring 43 is then inserted in the step 42 at the rear of the inner unit 1. The next operation is to insert the end plate 4 which must be pushed forwardly so that the lip 31 on the inner unit 1 engages the shoulder 32 on the casing 2, so as to compress the support ring 40. In the preferred embodiment, the force to urge the inner unit 1 forwardly is obtained by applying suction to the spigot 56 so as to obtain a reduced pressure within the casing of, for example, between a quarter and a half atmosphere. When the reduced pressure has been achieved and the inner unit 1 is correctly located within the casing 2, the end plate 4 is sealed to the casing by means of the rings 53 and 54 and the solder 55. After the solder 55 has hardened, the suction may be removed, thereby allowing the pressure within the casing to revert to its desired level before the spigot 56 is sealed.

The seal formed by the solder 55 is sufficient to retain the inner unit 1 against the forces exerted by the support ring 40 even without a reduced pressure within the casing 2.

It will be appreciated that various other arrangements could be used to retain the inner unit 1 in its correct location while the end plate 4 is being sealed to the casing 2. In this respect, the end plate 4 could be urged forwardly into the casing 2 by means, for example, of clamps.

It will be appreciated that the arrangement described above is not confined to use with gyroscope apparatus but can be used to mount other apparatus in a casing.

What we claim is:

1. Gyroscope apparatus comprising:
   an outer casing, said outer casing having a transverse face therein towards a forward end of the casing and having shoulder means towards the rear end of the inside of the casing;
   an inner unit located within said outer casing, said inner unit having an inclined edge surface at its forward end which defines with said transverse face an annular recess of substantially triangular section, said inner unit having engagement means towards its rear end located to engage said shoulder means to limit forward displacement of the inner unit along the outer casing;
   a ring of resilient material located in said recess;
   and means securing said inner unit in said outer casing with the engagement means in contact with the shoulder means and with the resilient ring held in compression between the inner unit and the outer casing.

2. Apparatus according to claim 1, wherein said edge surface is inclined to said transverse face at an angle of about 60°.

3. Apparatus according to claim 1, wherein said recess and said ring are of circular shape.

4. Apparatus according to claim 1, wherein the said transverse face is provided by the inside face of the one end of the casing.

5. Apparatus according to claim 1, wherein said inclined edge surface is an outer edge surface around the inner unit.

6. Apparatus according to claim 1, wherein said outer casing is sealed at its rear end.

7. Gyroscope apparatus according to claim 6, wherein said engagement means on the inner unit is brought into contact with the shoulder means on the outer casing by reducing pressure within the forward end of the outer casing relative to pressure outside the casing.

8. Gyroscope apparatus according to claim 1, wherein said shoulder and said engagement means extend circumferentially around the interior of the casing and the exterior of the inner unit respectively.

* * * * *